United States Patent [19]

Matsui et al.

[11] Patent Number: 5,231,621
[45] Date of Patent: Jul. 27, 1993

[54] FOCUS DETECTOR WHICH SERVES TO SPLIT OFF A PORTION OF A DETECTED LIGHT BEAM ONLY WHEN THE DETECTED LIGHT BEAM IS NOT REFOCUSED AT AN EXPECTED REFOCUS POINT

[75] Inventors: Hiroshi Matsui; Osamu Koyama; Hideaki Yano, all of Kawasaki; Yasuo Nakamura, Musashino, all of Japan

[73] Assignees: Canon Kabushiki Kaisha, Tokyo; Canon Denshi Kabushiki Kaisha, Saitama, both of Japan

[21] Appl. No.: 776,866

[22] Filed: Oct. 16, 1991

Related U.S. Application Data

[63] Continuation of Ser. No. 651,611, Feb. 6, 1991, abandoned, which is a continuation of Ser. No. 425,355, Oct. 23, 1989, abandoned, which is a continuation of Ser. No. 91,961, Sep. 1, 1987, abandoned.

[30] Foreign Application Priority Data

Sep. 5, 1986 [JP] Japan ................. 61-210031

[51] Int. Cl.$^5$ ............................... G11B 7/095
[52] U.S. Cl. ................. 369/44.32; 250/201.5; 369/44.42; 369/112
[58] Field of Search ............. 369/44.14, 44.32, 44.41, 369/44.42, 53, 54, 55, 106, 109, 112, 118; 250/201.1, 201.5, 204; 354/402, 406, 407

[56] References Cited

U.S. PATENT DOCUMENTS

| | | | |
|---|---|---|---|
| 3,953,863 | 4/1976 | Lang ................. | 354/407 |
| 3,997,715 | 12/1976 | Elliott . | |
| 4,079,248 | 3/1978 | Lehureau et al. ............. | 250/204 X |
| 4,083,056 | 4/1978 | Nakamura et al. ................. | 354/407 |
| 4,533,826 | 8/1985 | van Alem . | |
| 4,631,397 | 12/1986 | Ohsato et al. . | |
| 4,654,839 | 3/1987 | Endo ................. | 369/118 X |
| 4,660,955 | 4/1987 | Ishida et al. ................... | 354/402 X |
| 4,670,869 | 6/1987 | Chen ................... | 369/109 |
| 4,682,315 | 7/1987 | Uejima ............... | 369/110 X |
| 4,682,316 | 7/1987 | Tateoka et al. . | |
| 4,683,559 | 7/1987 | Emoto et al. . | |
| 4,694,443 | 9/1987 | Ando . | |
| 4,701,604 | 10/1987 | Ando . | |
| 4,705,941 | 11/1987 | Yamada et al. ................. | 250/204 X |

FOREIGN PATENT DOCUMENTS

| | | |
|---|---|---|
| 0070552 | 1/1983 | European Pat. Off. . |
| 2107483 | 4/1983 | United Kingdom . |
| 2120493 | 11/1983 | United Kingdom . |

*Primary Examiner*—W. R. Young
*Attorney, Agent, or Firm*—Fitzpatrick, Cella, Harper & Scinto

[57] ABSTRACT

The present invention is directed to a focus detector, one embodiment of which includes a light source, a collimator lens, a beam splitter and an objective lens. The light emitted by the light source is collimated by the collimator lens and subsequently passed through the beam splitter. The objective lens focuses the light passing through the beam splitter on a rotating disk. The light reflected by the disk passes through the beam splitter and is directed to a sensor lens. The sensor lens directs the light beam to an optical element arranged in a light path adjacent a refocus point of the light beam. The optical element is so arranged that the light beam is split only when it is not refocused at the expected refocus point.

26 Claims, 15 Drawing Sheets

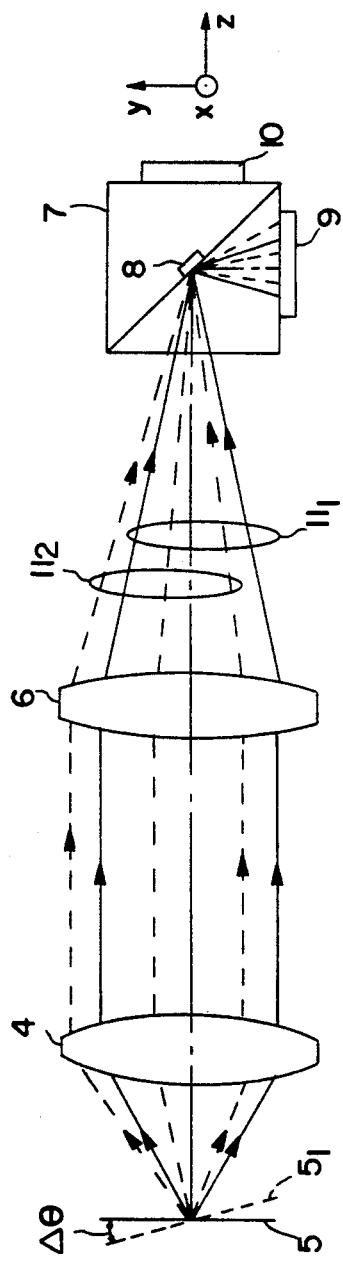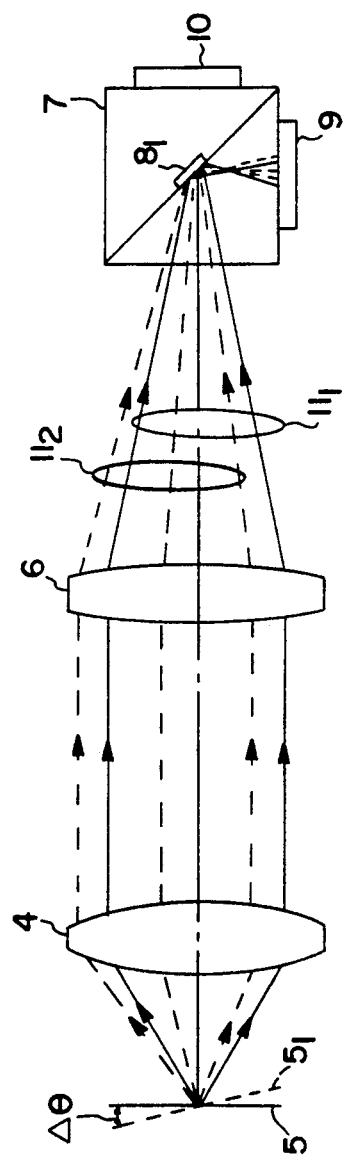
FIG.10
FIG.11

FOCUS DETECTOR WHICH SERVES TO SPLIT OFF A PORTION OF A DETECTED LIGHT BEAM ONLY WHEN THE DETECTED LIGHT BEAM IS NOT REFOCUSED AT AN EXPECTED REFOCUS POINT

This application is a continuation of prior application, Ser. No. 07/651,611 filed Feb. 6, 1991, which application is a continuation of prior application, Ser. No. 07/425,355 filed Oct. 23, 1989, which application is a continuation of prior application, Ser. No. 07/091,961 filed Sep. 1, 1987, all now abandoned.

BACKGROUND OF THE INVENTION

1. Field of the Invention

The present invention relates to a focus detector, and more particularly, to a focus detector suitable for use in an optical information recording and reproducing apparatus such as an optical disk.

2. Related Background Art

In a prior art optical information recording and reproducing apparatus which records and reproduced information by irradiating a focused light beam to record medium, auto-tracking (AT) of an irradiated light beam is essential in order to attain a high record density. For example, in U.S. Pat. No. 4,079,248, FIG. 1–FIG. 2B, and in the specification thereof at Col. 2, line 19–Col. 4, line 60 show and describe, respectively, a focus detection method for AT.

FIGS. 1A–1C herein illustrate a principle of a prior art focus detector which uses a knife edge. A light beam reflected by a disk 101 as an information record medium is directed to photo-sensing planes 105–106 of a two-split sensor by an objective lens 102 and a sensor lens 103. A knife edge 104 is inserted in a light path of the reflected light beam and is positioned such that light amounts arriving on the photo-sensing planes 105 and 106 are equal in an in-focus state as shown in FIG. 1A. Thus, when the disk is moved away from the infocus position as shown in FIG. 1B, the light amount of the light beam directed to one photo-sensing plane 105 decreases and when the disk moves closer as shown in FIG. 1C, the light amount directed to the other photo-sensing plane 106 decreases. Thus, since the light amounts directed to the photo-sensing planes 105 and 106 of the two-split sensor change depending on the defocus state of the disk, a focusing error signal may be obtained by differentiating the outputs of the respective photo-sensing planes.

However, in the above apparatus, if the disk 101 is inclined by reference numeral $\Delta\theta$ as shown by 107 in FIG. 1A by a phone swing due to rotation of the disk, the reflected light 108 shifts as shown by broken lines 109 so that the output of the photo-sensing plane 105 is larger than the output of the photo-sensing plane 106. This state is indistinguishable from the state shown in FIG. 1C where the disk has moved closer and erroneous focus detection takes place. Such error also occurs by an external disturbance such as a shift of light beam on the sensor plane or variation in the light intensity distribution due to other causes such as movement of the objective lens.

On the other hand, focus detectors which operate on principles other than that of the above apparatus are shown and described in U.S. Pat. No. 3,997,715, with respect to FIG. 7 and in the specification thereof at Column 6, line 3–Column 7, line 11, in U.S. Pat. No. 4,654,839, with respect to FIG. 4A–FIG. 4D and in the specification thereof at Column 4, line 52–Column 5, line 65, and in copending U.S. patent application Ser. No. 739,342 now U.S. Pat. No. D295,749 (filed on May 21, 1985 and assigned to the assignee of the present invention), with respect to FIGS. 3–5C and in the specification thereof at page 6, line 7–page 9, line 7. In those apparatus, the focused light beam reflected from a workpiece is split into a peripheral portion and a center portion and the respective split light beams are sensed by separate photo-detectors. A focusing error signal is obtained by a finite difference of the outputs of the photo-detectors.

In those focus detectors, however, if the optical axis is inclined, the proportions of the light amounts of the split light beam change and correct focus detection is difficult to attain.

SUMMARY OF THE INVENTION

It is an object of the present invention to provide a focus detector which solves the problems encountered in the prior art apparatus and assures a correct focusing error signal even if the optical axis is inclined.

The above object of the present invention is achieved by arranging an optical element which serves to split a portion of a detected light beam only when an irradiated light beam is not in an in-focus state on an object surface, in the vicinity of a focus point of the detected light beam which is formed by focusing the light beam irradiated to the object surface and reflected thereby or transmitted therethrough.

BRIEF DESCRIPTION OF THE DRAWINGS

FIG. 10 illustrates light beam shift in the first embodiment.

FIG. 11 shows a modification of an optical element arrangement in the first embodiment.

DETAILED DESCRIPTION OF THE PREFERRED EMBODIMENTS

Figure 1A:
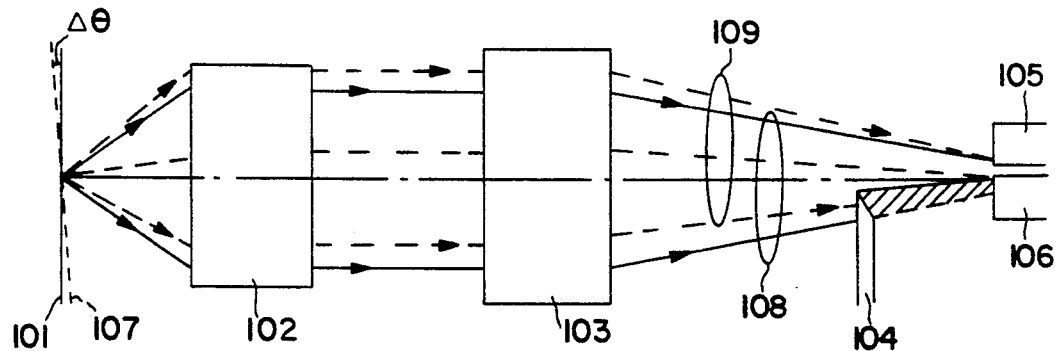
FIGS. 1A–1C illustrate a principle of focus detection by a conventional knife edge method.
Figure 1B:
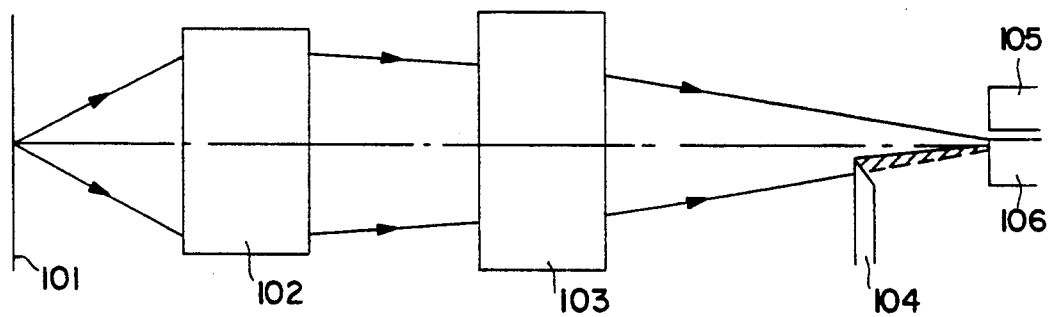
Figure 1C:
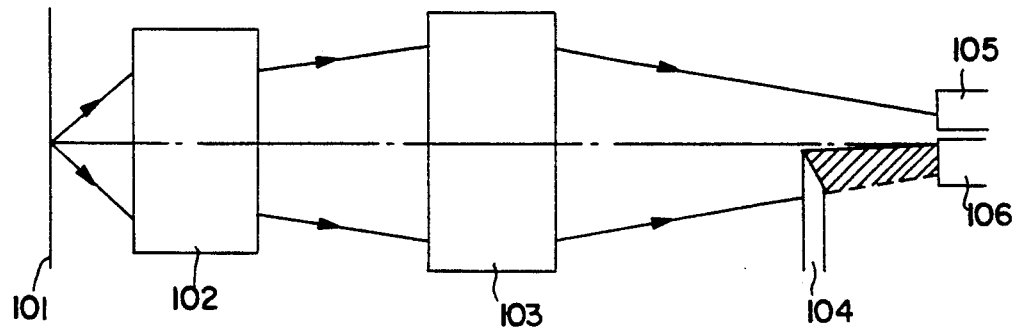
Figure 2:
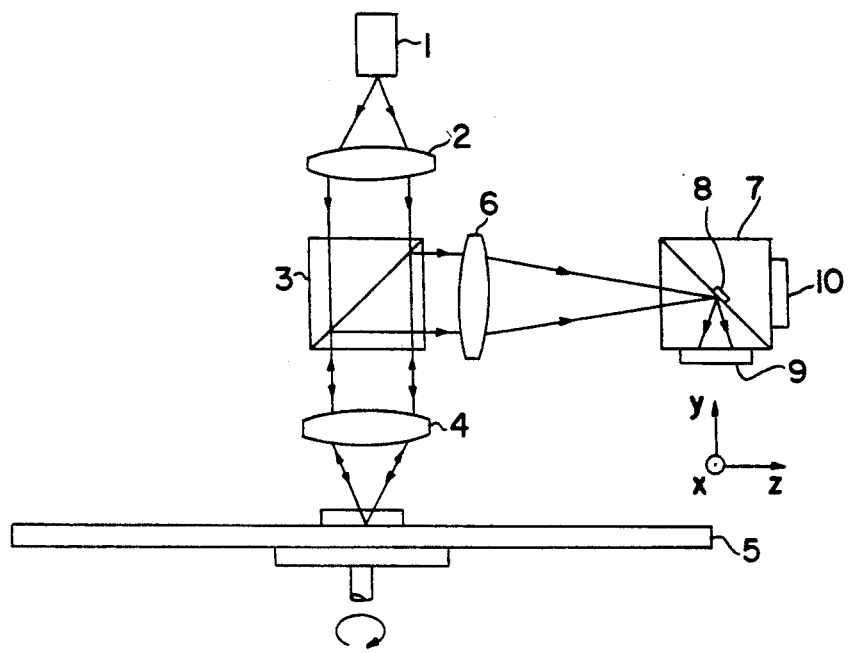
FIG. 2 shows a first embodiment of the present invention applied to a disk apparatus.

FIG. 2 shows a first embodiment of the focus detector of the present invention applied to an optical disk apparatus. A light beam emitted from a light source 1, such as a semiconductor laser, is collimated by a collimator lens 2, passes through a beam splitter 3 and is focused by an objective lens 4 onto a rotating disk 5 which is an object to be tested. The light beam reflected by the disk 5 passes through the objective lens 4 and is reflected by the beam splitter 3 and again focused by a sensor lens 6 to form a detection light beam. An optical element 7 which comprises a junction of triangular prisms and has a stripe-shaped reflection area 8 formed on a portion of the junction plane is arranged in a light path near a focus point of the detection light beam. A sensor 9 which senses the detection light beam reflected by the reflection area 8 is arranged on one surface of an outer periphery of the optical element 7, and a sensor 10 which senses a portion of the detection light beam which is not reflected by the reflection area 8, but is separated therefrom, is provided on the other surface.

Figure 3:
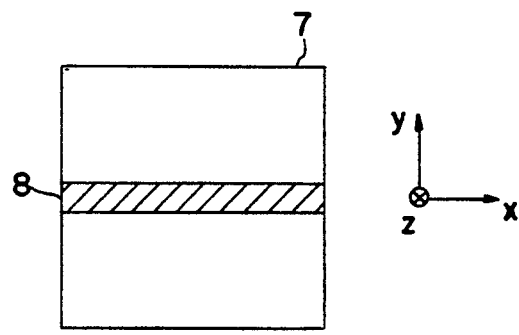
FIG. 3 shows an optical element of the first embodiment.

FIG. 3 shows a side view of the optical element 7 as viewed in the Z direction. The reflection area 8 is of a stripe shape having a predetermined width so that it totally reflects the detection beam flux and directs it to the sensor 9 when the irradiated light beam is in the in-focus state on the disk 5 as shown in FIG. 2. The stripe-shaped reflection area 8 thus has a width corresponding to a light beam diameter (beam waist) at the focus point. The optical element 7 is arranged such that the y-axis thereof is parallel to a longitudinal direction of a track on the disk 5. A longitudinal direction of the stripe-shaped reflection area 8 corresponds to a direction orthogonal to the track.

Figure 4A:
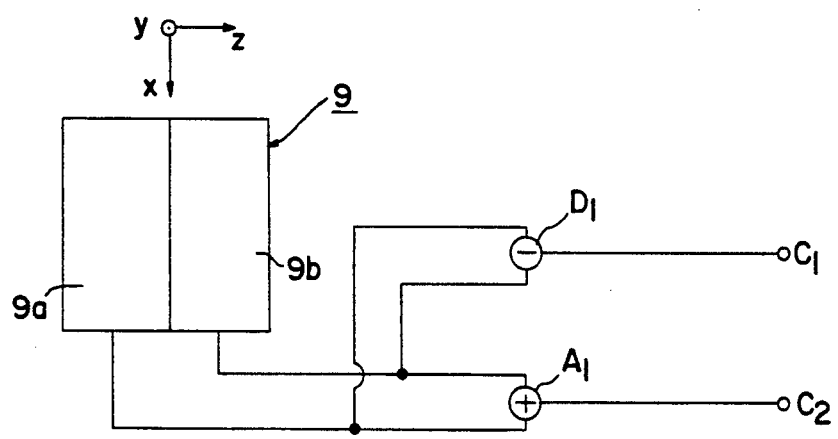
FIGS. 4A and 4B show a sensor and signal processing circuit of the first embodiment.

The sensor 9 has a photo-sensing plane thereof split into sections $9a$ and $9b$ by a split line parallel to the longitudinal direction of the track as shown in FIG. 4A. Signals produced by the photo-sensing planes $9a$ and $9b$ are finitely differentiated by a subtractor $D_1$ so that a tracking signal indicating a positional deviation of the irradiated light beam from the track is produced at a terminal $C_1$ by a well-known tracking signal detection principle (so-called push-pull method). The outputs of the photo-sensing planes $9a$ and $9b$ are summed by an adder $A_1$ and a sum signal is produced at a terminal $C_2$.

Figure 4B:
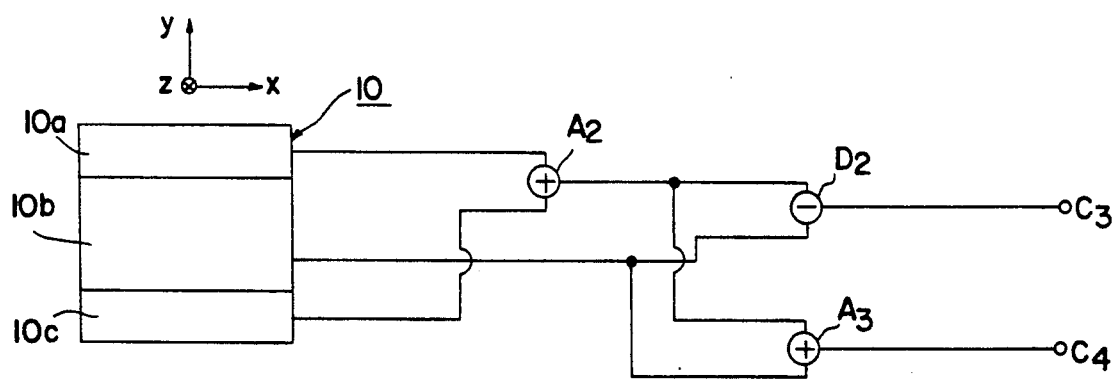

On the other hand, the sensor 10 has a photo-sensing plane thereof split into three sections $10a$, $10b$ and $10c$ by two split lines parallel to a line normal to the track as shown in FIG. 4B.

The signals of the photo-sensing planes $10a$ and $10c$ are summed in an adder $A_2$ and a sum signal and the output signal of the photo-sensing plane $10b$ are finitely differentiated by a subtractor $D_2$ so that a focus error signal is produced at a terminal $C_3$. The output of the adder $A_2$ and the photo-sensing plane $10b$ are summed by an adder $A_3$ and a sum signal is produced at a terminal $C_4$. A sum of the outputs at the terminals $C_2$ and $C_4$ represents a total light intensity of the detection light beam, and a reproduced RF signal corresponding to the information recorded on the disk 5 is produced by adding those signals.

Referring to FIGS. 5A to 7C, a principle of focus detection in the present invention is explained.

Only the detection system of the previous embodiment is shown in a simplified form, and like elements to those shown in the previous embodiment are designated by like numerals and detailed explanation thereof is omitted. FIGS. 6A–6C and FIGS. 7A–7C show light distributions on the sensors 10 and 9 corresponding to the states shown in FIGS. 5A–5C, respectively.

Figure 5A:
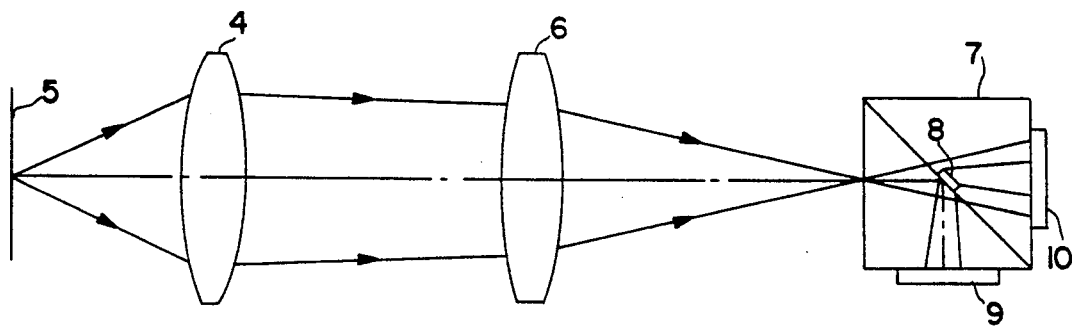
FIGS. 5A–7C illustrate a principle of focus detection in the first embodiment.
Figure 5B:
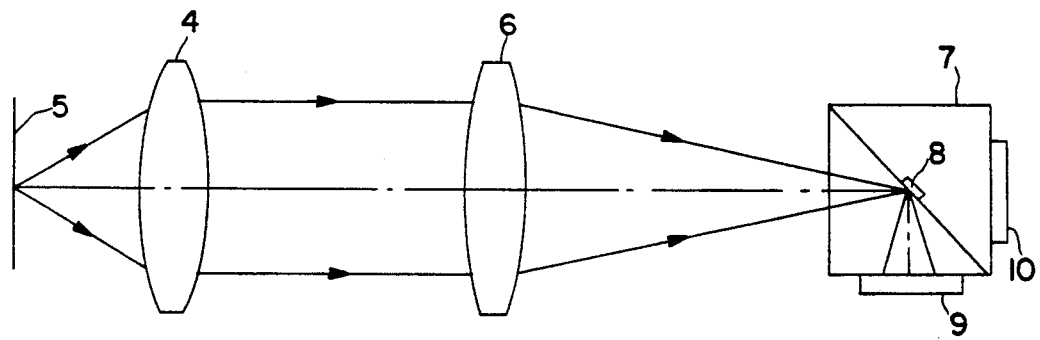
Figure 6A:
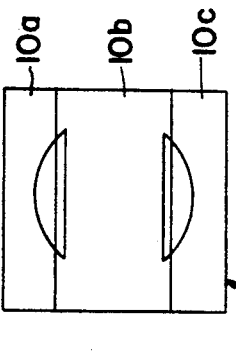
Figure 6B:
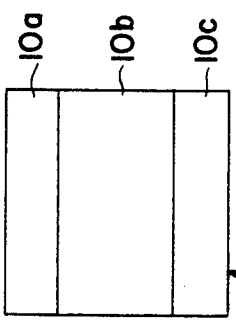
Figure 6C:
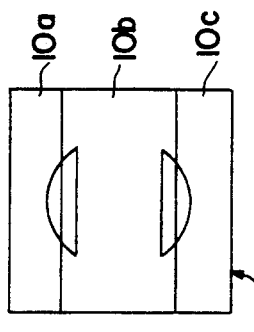
Figure 7A:
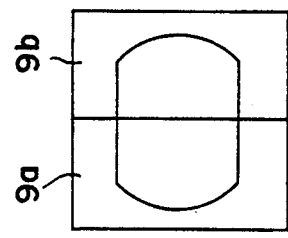
Figure 7B:
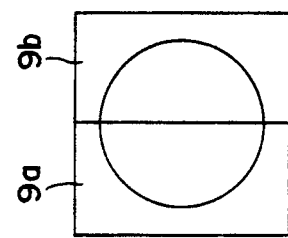
Figure 7C:
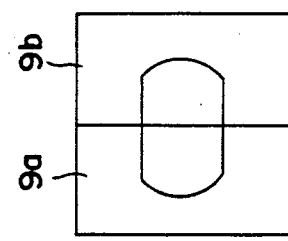

In the in-focus state shown in FIG. 5B, the detection light beam is directed to the reflection area 8 at the focus point and totally reflected thereby and sensed only by the sensor 9 as shown in FIG. 7B. Accordingly, as shown in FIG. 6B, the light beam does not reach the sensor 10 and no output is produced at the terminal $C_3$ of FIG. 4B. As the disk 5 moves away as shown in FIG. 5A, the focus point of the detection light beam moves forward and the detection light beam overflows from the reflection area 8 and a portion thereof is split and detected by the sensor 10. A portion of an arcuate spot is directed to the photo-sensing plane of the sensor 10 as shown in FIG. 6A. Since the light intensity of the photo-sensing planes $10a$ and $10c$ is larger than the light intensity of the photo-sensing plane $10b$, a positive focus error signal is produced at the terminal $C_3$ of FIG. 4B. As the disk 5 further moves away, the spot directed to the sensor 10 spreads and the difference between the photo-sensing plane light intensities further increases. As a result, a focus error signal of a magnitude corresponding to the defocus amount of the disk 5 from the in-focus position is produced at the terminal $C_3$.

Figure 5C:
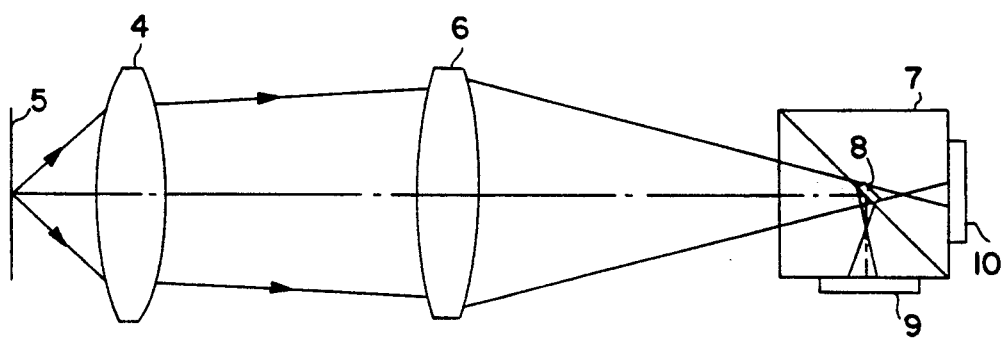

On the other hand, as the disk 5 moves close as shown in FIG. 5C, the focus point of the detection light beam moves backward and the detection light beam again overflows from the reflection area 8 and a portion thereof is split and directed to the sensor 10. Since the light intensity of the photo-sensing planes $10a$ and $10c$ is smaller than the light intensity of the photo-sensing plane $10b$ as opposed to the case of FIG. 5A, a negative focus error signal is produced at the terminal $C_3$ of FIG. 4B. The magnitude of the focus error signal represents the defocus amount of the disk 5 from the in-focus position.

Figure 8:
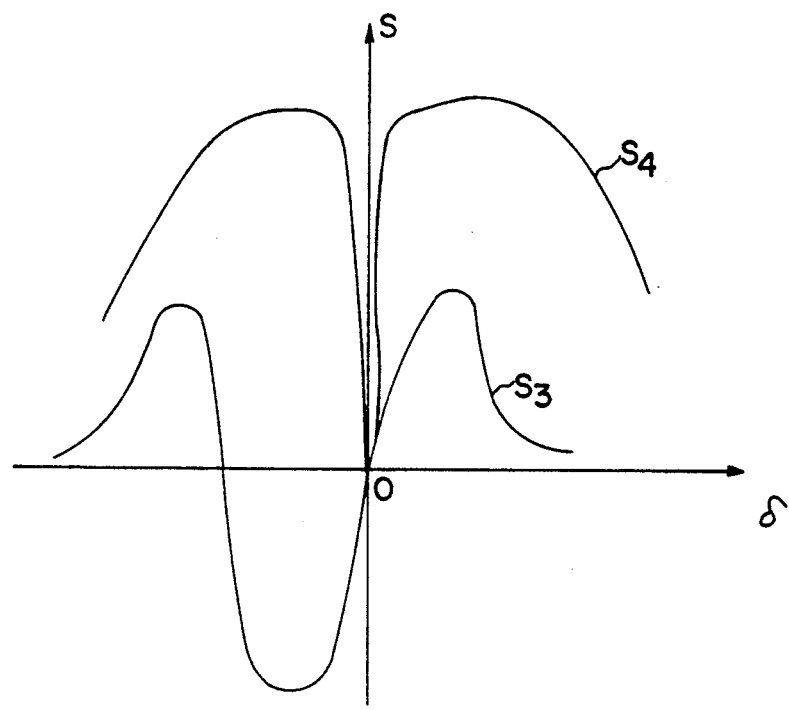
FIGS. 8 and 9 show signal outputs produced in the first embodiment.
Figure 9:
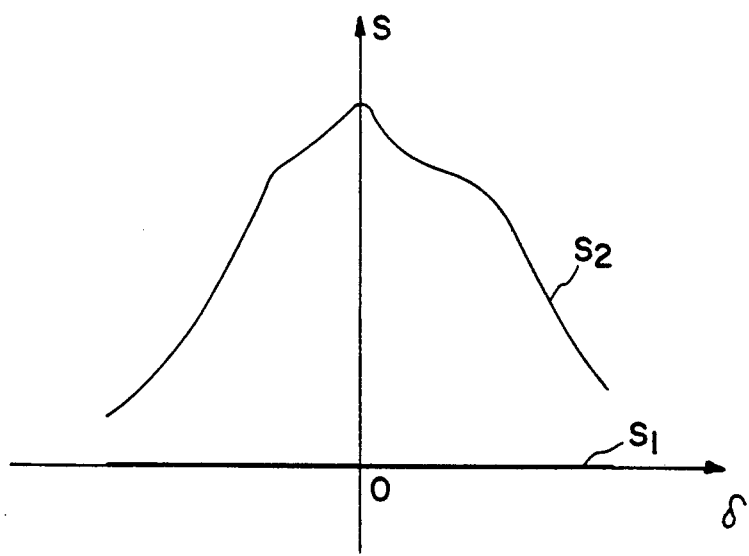

FIGS. 8 and 9 show signal outputs of the sensors 10 and 9, respectively, $S_1$, $S_2$, $S_3$ and $S_4$ represent outputs at the terminals $C_1$, $C_2$, $C_3$ and $C_4$ of FIGS. 4A and 4B, respectively. The abscissa represents the defocus amount $\delta$ of the disk 5 from the in-focus position and the ordinate represents the magnitude S of the signal output. In accordance with the present embodiment, the focus error signal $S_3$ representing the direction and magnitude of defocusing is produced at the terminal $C_3$. As seen from FIG. 9, the tracking signal $S_1$ is always zero, irrespective of $\delta$ so that the tracking detection is not affected by the defocusing.

In the present embodiment, the focus error signal is not affected by the inclination of the disk 5. For example, as shown by broken lines in FIG. 10, when the disk 5 inclines by $\Delta\theta$ as shown by $5_1$ and the detection light beam $11_1$ is shifted as shown by $11_2$, the detection light beam is not applied to the sensor 10 and no malfunction occurs, because the reflection area 8 is located at the focus point. The focus error signal is also not affected by the shift of the light beam when the tracking objective lens 4 is moved in the x direction or by the change of light intensity distribution in the detection light beam. In the present embodiment, since the reflection area 8 is of stripe shape, a positional accuracy of the optical element 7 in the x direction need not be very high and the optical adjustment can be attained by moving the optical element 7 only in the y direction.

In the present embodiment, the reflection area 8 is located at the focus point of the detection light beam. Alternatively, as shown in FIG. 11, the reflection area $8_1$ may be located at a position other than the focus point in the vicinity of the focus point if the width of the reflection area $8_1$ is selected somewhat wider so that the shift of the light beam does not affect the focus error signal. However, in this case, the reflection area $8_1$ must be located between a front focus point and a rear focus point of the detection light beam when the defocusing is along the optical axis. In FIGS. 10 and 11, like elements to those shown in FIG. 5A are designated by like numerals and detailed explanation thereof is omitted.

Figure 12:
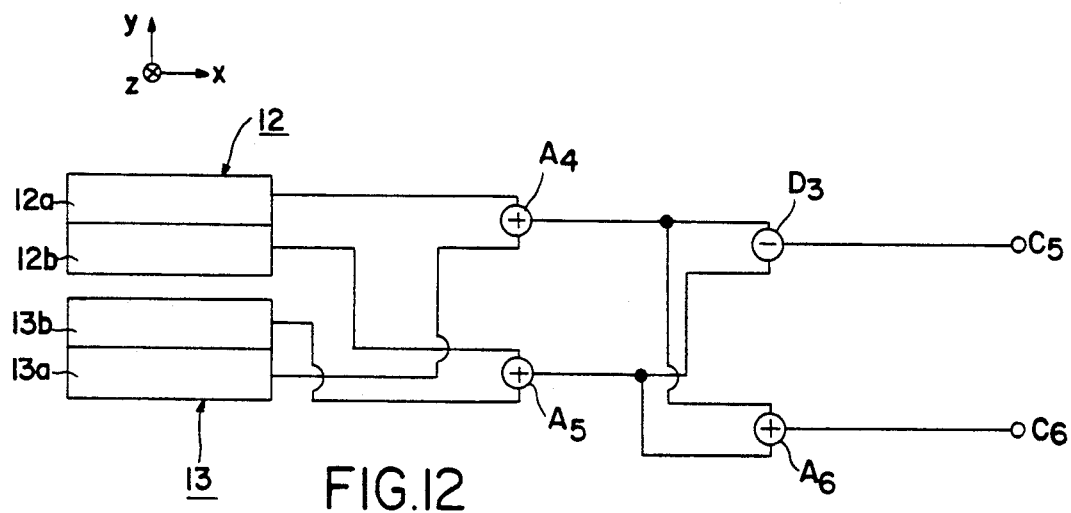
FIGS. 12 and 13 show modifications of the sensor in the first embodiment.
Figure 13:
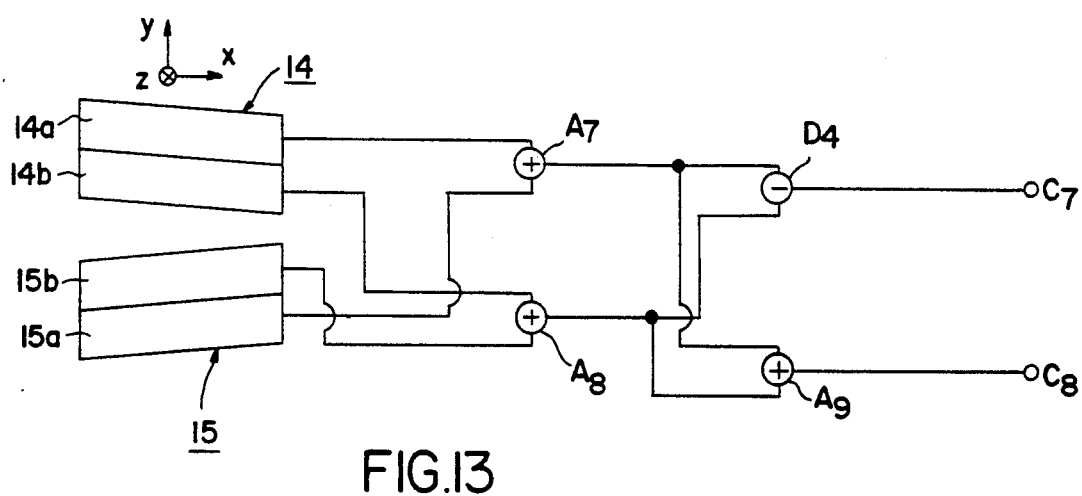

FIG. 12 shows a modification of the sensor in the first embodiment. The sensor 10 in FIG. 2 may be replaced by two sensors 12 and 13, each having the photo-sensing plane thereof split into sections 12a and 12b, and 13a and 13b. The outputs from the respective photo-sensing planes are applied to adders $A_4$, $A_5$ and $A_6$ and a subtractor $D_3$ as shown and a focus error signal and a light intensity signal are produced at terminals $C_5$ and $C_6$, respectively, by the same principle as that of the previous embodiment. The present embodiment is effective when it is difficult to manufacture a large size sensor, or when manufacturing precision of the reflection area 8 is not sufficient to prevent leakage of the light so that a ghost light is created between the sensors 12 and 13. The sensor 10 of FIG. 2 may be replaced by sensors 14 and 15 shown in FIG. 13 in which a split line of photo-sensing planes 14a and 14b and a split line of photo-sensing planes 15a and 15b are not parallel, but are angled to each other. The outputs from the respective photo-sensing planes are supplied to adders $A_7$, $A_8$ and $A_9$ and a subtractor $D_4$ as shown, and a focus error signal and a light intensity signal are produced at terminals $C_7$ and $C_8$ by the same principle as that of the previous embodiment. In the present embodiment, in addition to the advantages of the embodiment of FIG. 12, a ratio of light beam split can be controlled by moving the sensors 14 and 15 in the x direction, because the spacing between the split lines of the photo-sensing planes varies along the x direction. Thus, manufacturing error of the optical element can be compensated in the adjustment stage of the optical system. The sensors 9 and 10, 12 and 13 or 14 and 15 may be integrated with the optical element 7 or they may be bonded to the outer peripheral surfaces of the optical element 7.

Figure 14:
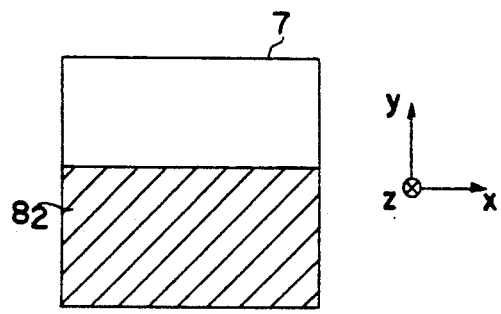
FIGS. 14 and 15 show modifications of the optical element in the first embodiment.
Figure 15:
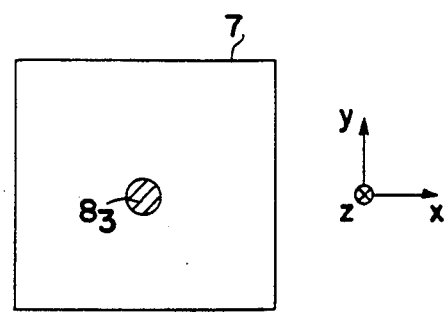

The reflection area of the optical element 7 need not be of stripe shape, but it may be a divided reflection area so that a split line thereof is displaced with regard to the center portion of an incident light beam as shown by a hatched area $8_2$ of FIG. 14. In this case, the optical adjustment is easy, because only one of the two split light beam spots shown in FIG. 6A is created. The reflection area need not be of stripe shape, but it may be of a circle having a predetermined area as shown by a hatched area $8_3$ of FIG. 15. In this case, the focus error signal is produced in the same manner as that of the previous embodiment.

Figure 16:
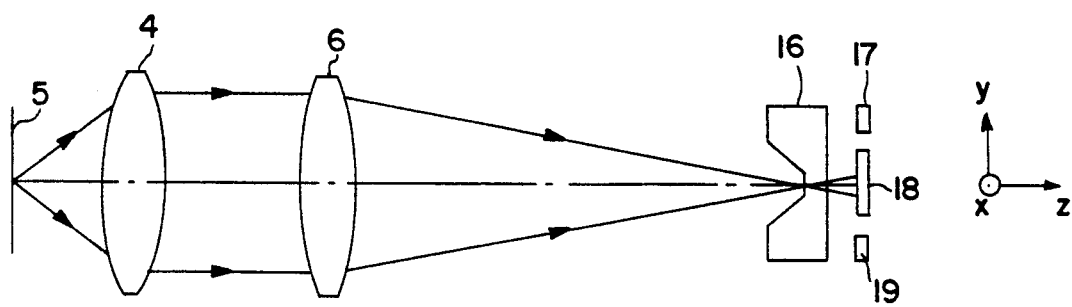
FIG. 16 shows a second embodiment of the present invention.
Figure 17A:
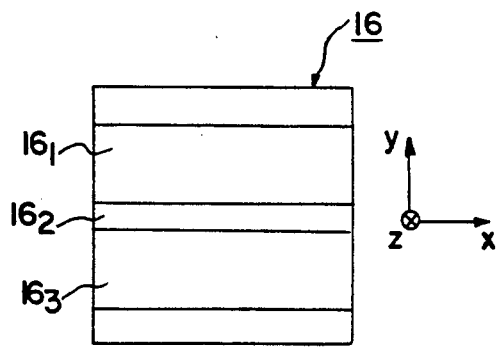
FIGS. 17A and 17B show an optical element in the second embodiment.
Figure 17B:
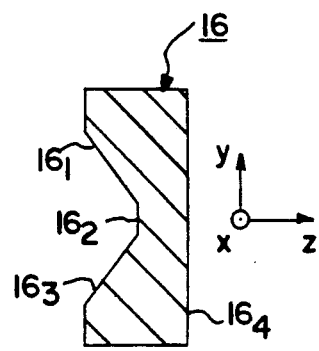

FIG. 16 shows a second embodiment of the present invention. While only the detection system is shown in a simplified form, the illumination system may be of the same construction as that of FIG. 2. The like elements to those shown in FIG. 2 are designated by like numerals and detailed explanation thereof is omitted. In the present embodiment, a transmission type optical element 16 is used in place of the optical element 7. As shown in a plan view of FIG. 17A and a sectional view of FIG. 17B, the optical element 16 is basically a plate-like member which is made of transparent material such as glass or plastic. It has a stripe-shaped area $16_2$ at the center, which is parallel to the opposing plane $16_4$, and outer areas $16_1$ and $16_3$ thereof are inclined with respect to the plane $16_4$. A sensor 18 for sensing a detection light beam which has passed through the plane $16_2$ is provided on the back side of the optical element 16. Sensors 17 and 19 sense portions of the detection light beam applied to and refracted by the inclined planes $16_1$ and $16_3$ of the optical element 16 in the defocus state.

Figure 18:
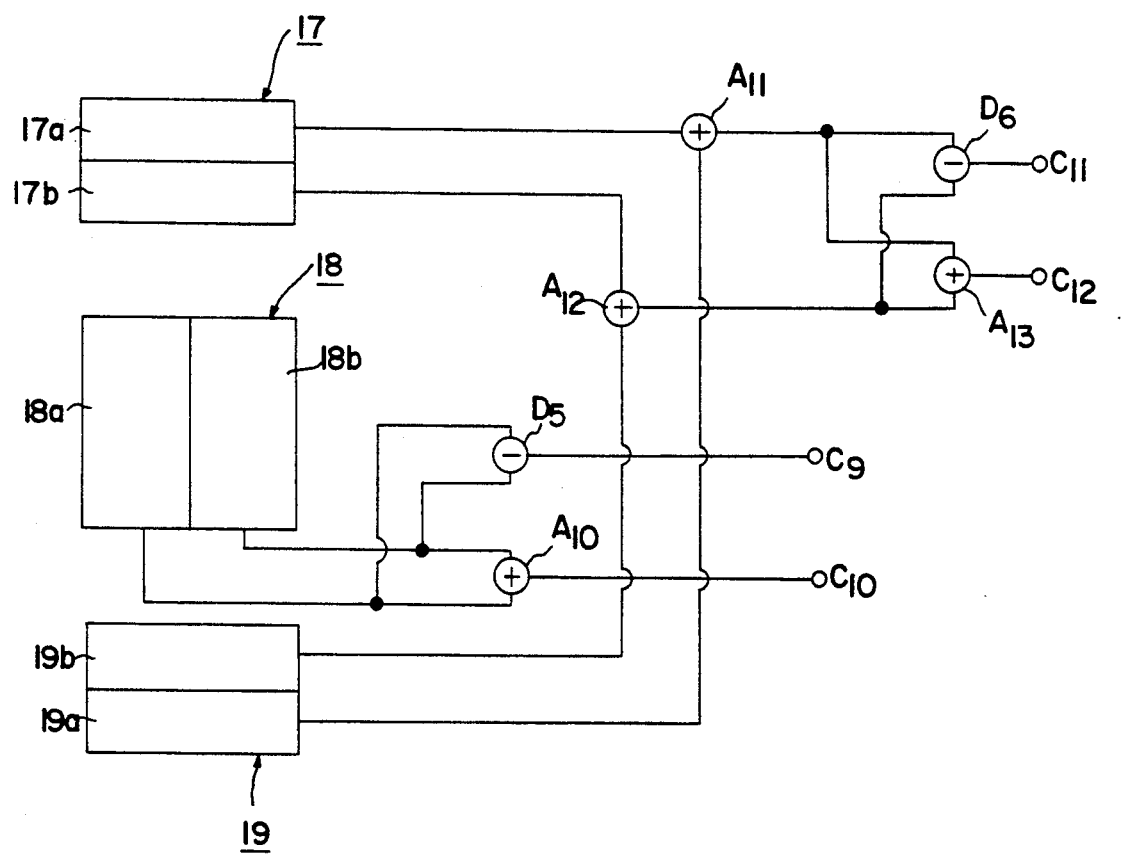
FIG. 18 shows a sensor and signal processing circuit in the second embodiment.

FIG. 18 shows the photo-sensing planes of the sensors and a signal processing circuit in the present embodiment. The sensor 18 has the photo-sensing plane thereof split into two sections 18a and 18b by a split line parallel to the longitudinal direction of the track. The signals from the respective photo-sensing planes are summed and subtracted by an adder $A_{10}$ and a subtractor $D_5$, respectively, so that a light intensity signal and a tracking signal are produced at terminals $C_{10}$ and $C_9$, respectively. The sensors 17 and 19 each have the photo-sensing plane thereof split into two sections 17a and 17b, and 19a and 19b by a split line parallel to a line normal to the track. The outputs from the photo-sensing planes 17a and 19a and the outputs from the photo-sensing planes 17b and 19b are summed by adder $A_{11}$ and $A_{12}$, respectively. Sum signals from the adder $A_{11}$ and $A_{12}$ are summed and subtracted by an adder $A_{13}$ and a subtractor $D_6$, respectively, so that a focus error signal and a light intensity signal are produced at terminals $C_{11}$ and $C_{12}$, respectively. A reproduced RF signal is produced by summing the outputs of the terminals $C_{10}$ and $C_{12}$.

Figure 19C:
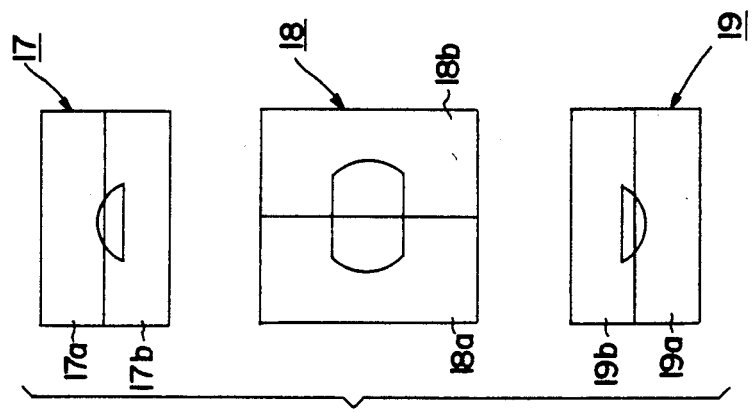
FIGS. 19A, 19b and 19C illustrate a principle of focus detection in the second embodiment.
Figure 19B:
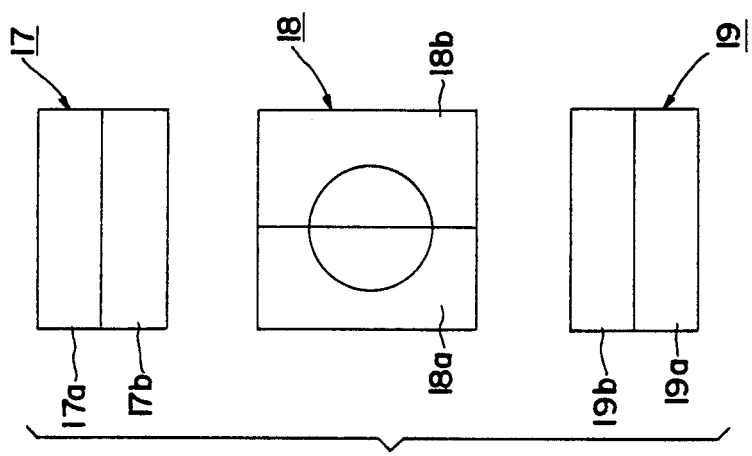
Figure 19A:
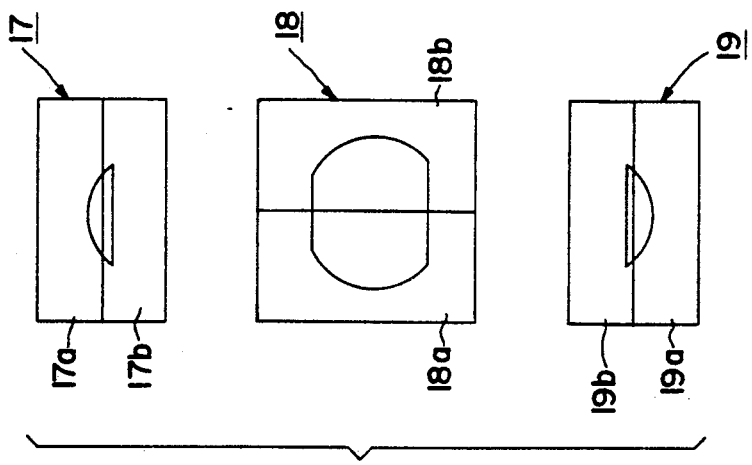

FIGS. 19A to 19C show detection light beams on the sensor planes in various focus states. The principle of the focus detection in the present embodiment is basically identical to that of the first embodiment. For example, in the in-focus state, the detection light beam totally passes through a parallel plane $16_2$ of the optical element 16 and is directed only to the sensor 18 as shown in FIG. 19B. As a result, no focus error signal is produced. The stripe-shaped parallel plane $16_2$ has a width corresponding to a beam waist of the detection light beam. As the disk 5 moves away, the detection light beam overflows from the plane $16_2$ of the optical element 16, is refracted by the inclined planes $16_1$ and $16_3$ so that a portion of the light beam is split and is sensed by the sensors 17 and 19 as shown in FIG. 19A. The light intensities of the photo-sensing planes 17b and 19b are larger than the light intensities of the photo-sensing planes 17a and 19a so that a positive focus error signal is produced at a terminal $C_{11}$ of FIG. 18. On the other hand, when the disk 5 approaches too close to the objective lens 4, the detection light beam is split by the optical element 16 and directed to the sensors 17 and 19 as shown in FIG. 19C. In this case, the light intensities of the photo-sensing planes 17a and 19a are larger than the light intensities of the photo-sensing planes 17b and 19b, and a negative focus error signal is produced at the terminal $C_{11}$ of FIG. 18.

In the present embodiment, the focus error signal is detected without affecting the tracking signal, as is done in the first embodiment. The present embodiment is similar to the first embodiment in that a malfunction due to the inclination of the disk is less likely to occur.

Figure 20:
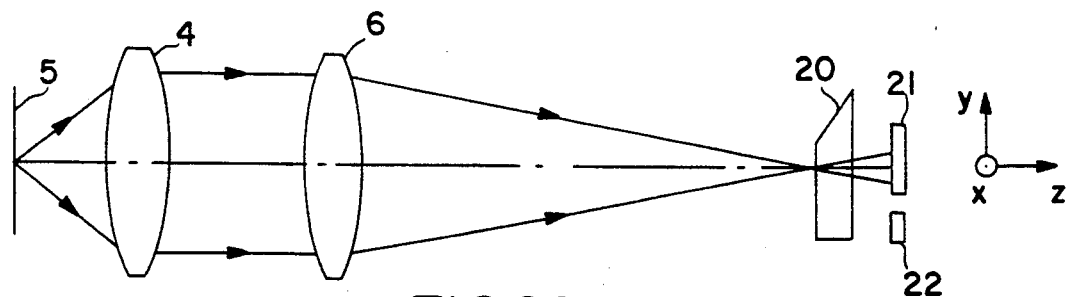
FIG. 20 shows a third embodiment of the present invention.
Figure 21A:
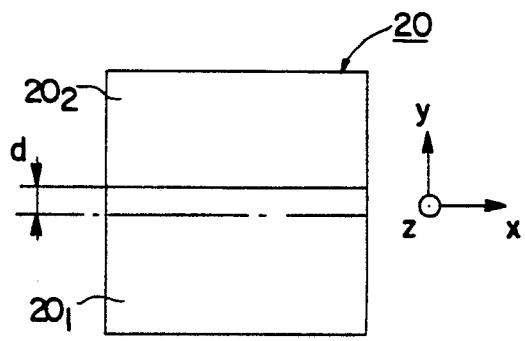
FIGS. 21A and 21B show optical elements in the third embodiment.
Figure 21B:
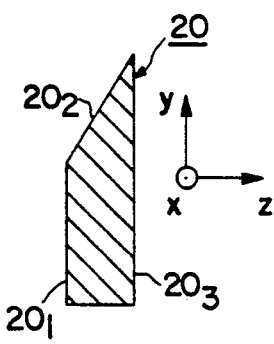

FIG. 20 shows a third embodiment of the present invention. While only the detection system is shown in a simplified form, the illumination system may be identical to that of FIG. 2. The like elements to those shown in FIG. 2 are designated by like numerals and detailed description thereof may be omitted. In the present embodiment, a transmission type optical element 20 is used in place of the optical element 7 of FIG. 2. As shown in a plan view of FIG. 21A and a sectional view of FIG. 21B, the optical element 20 is basically a plate-like member made of transparent material such as glass or plastic. One plane of the optical element 20 is split into a plane $20_1$ which is parallel to the other plane $20_3$ and a plane $20_2$ which is inclined with respect to the plane $20_3$. The optical element 20 is arranged in a light path of the detection light beam so that the split line is spaced from an optical axis by a distance d. A sensor 21 for sensing the detection light beam which has passed through the plane $20_1$ and a sensor 22 which senses a portion of the detection light beam refracted by the inclined plane $20_2$ in the defocus state are arranged on the back side of the optical element 20.

Figure 22:
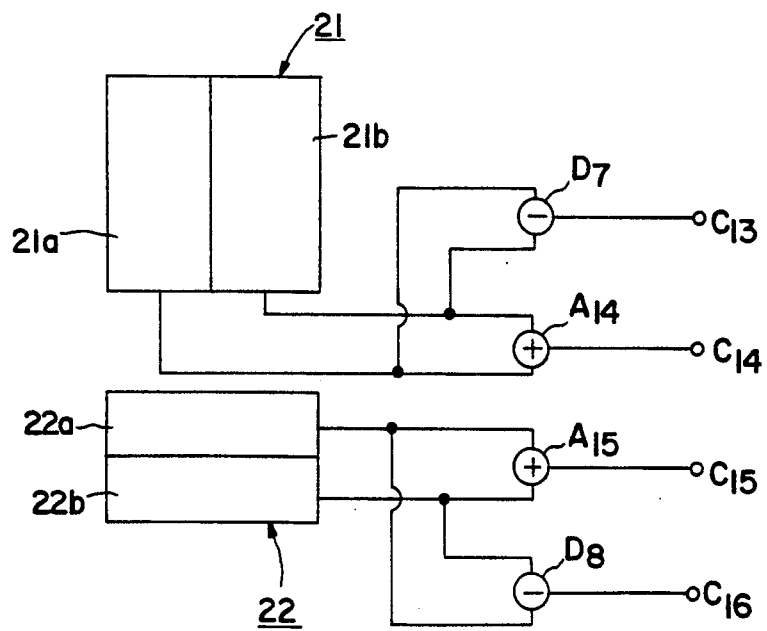
FIG. 22 shows a sensor and signal processing circuit in the third embodiment.

FIG. 22 shows the photo-sensing planes of the sensors and a signal processing circuit in the present embodiment. The sensor 21 has the photo-sensing plane thereof split into two sections 21a and 21b by a split line parallel to the longitudinal direction of the track. The signals from the respective photo-sensing planes are summed and subtracted by an adder $A_{14}$ and a subtractor $D_7$, respectively, so that a light intensity signal and a tracking signal are produced at terminals $C_{14}$ and $C_{13}$, respectively. The sensor 22 has the photo-sensing plane thereof split into two sections 22a and 22b by a split line parallel to a line normal to the track. The outputs of the photo-sensing planes 22a and 22b are summed and subtracted by an adder $A_{15}$ and a subtractor $D_6$ so that a focus error signal and a light intensity signal are produced at terminals $C_{16}$ and $C_{15}$, respectively. A reproduced RF signal is produced by summing the outputs of the terminals $C_{14}$ and $C_{15}$.

Figure 23C:
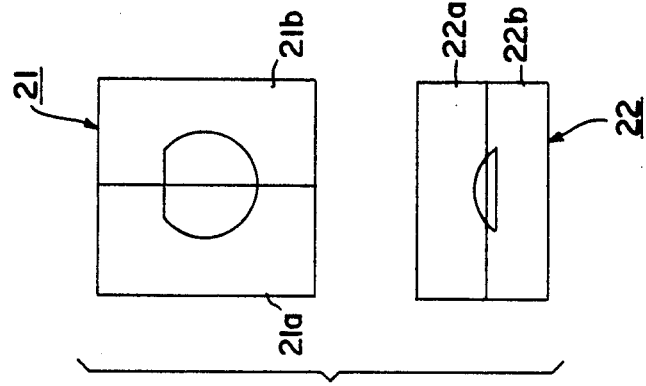
FIGS. 23A, 23B and 23C illustrate a principle of focus detection in the third embodiment.
Figure 23B:
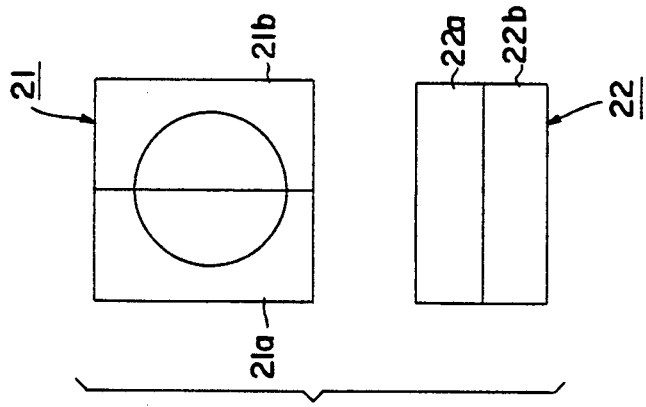
Figure 23A:
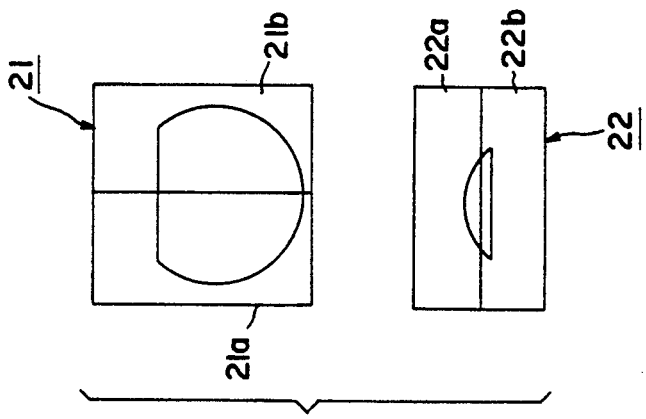

FIGS. 23A to 23C show the detection light beams on the sensor planes in various focus states. The principle of the focus detection in the present embodiment is basically identical to that of the first embodiment. For example, in the in-focus state, the detection light beam totally passes through the parallel plane $20_1$ of the optical element 20 and is directed to only the sensor 21 as shown in FIG. 23B. As a result, no focus error signal is produced. As the disk 5 moves away, the detection light beam overflows from the plane $20_1$ of the optical element 20, is refracted by the inclined plane $20_2$ and a portion thereof is split and sensed by the sensor 22 as shown in FIG. 23A. The light intensity of the photo-sensing plane 22a is larger than the light intensity of the photo-sensing plane 22b so that a positive focus error signal is produced at the terminal $C_{16}$ of FIG. 22. On the other hand, when the disk 5 approaches too closely to the objective lens 4, the detection light beam is split by the optical element 20 and directed to the sensor 22 as shown in FIG. 23C. In this case, the light intensity of the photo-sensing plane 22b is larger than the light intensity of the photo-sensing plane 22a so that a negative focus error signal is produced at the terminal $C_{16}$ of FIG. 22. The present embodiment offers the same advantages as those which the first embodiment does.

Figure 24:
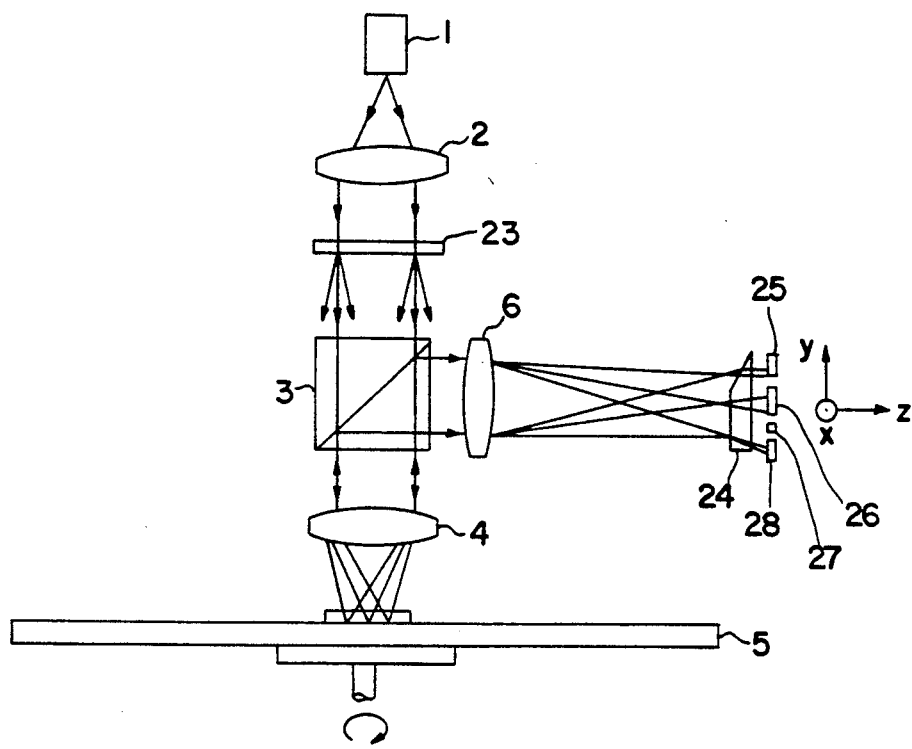
FIG. 24 shows a fourth embodiment of the present invention.

FIG. 24 shows a fourth embodiment of the focus detector of the present invention applied to an optical disk. The like elements to those shown in FIG. 2 are designated by like numerals and detailed explanation thereof is omitted. In the present embodiment, a diffraction grating 23 is arranged in a light path of an illumination light beam so that it splits the light beam into three beams to form three spots on the disk 5. The spots are irradiated such that the center spot is directed to the center of the track on the disk 5 and the spots at the opposite ends are directed in half to the opposite sides of the track. The light reflected by the center spot is sensed by the sensors 26 and 27 to detect the reproduced RF signal and the focusing signal, and the light beams reflected by the opposite end spots are sensed by the sensors 25 and 28 to produce the tracking signal by a well-known three-beam method.

Figure 25:
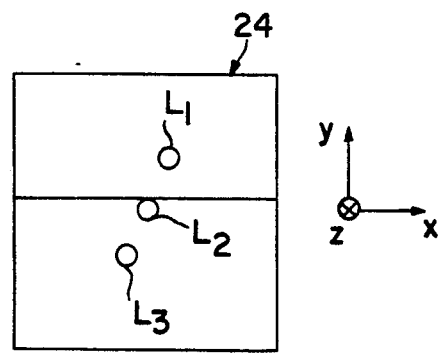
FIG. 25 shows a positional relationship of an optical element and a detected light beam in the fourth embodiment.

The optical element 24 which is identical to the optical element 20 of the third embodiment is arranged in the light path of the reflected light beam, and three light beams $L_1$, $L_2$ and $L_3$ corresponding to the three spots are directed to the optical element 24 as shown in FIG. 25.

Figure 26:
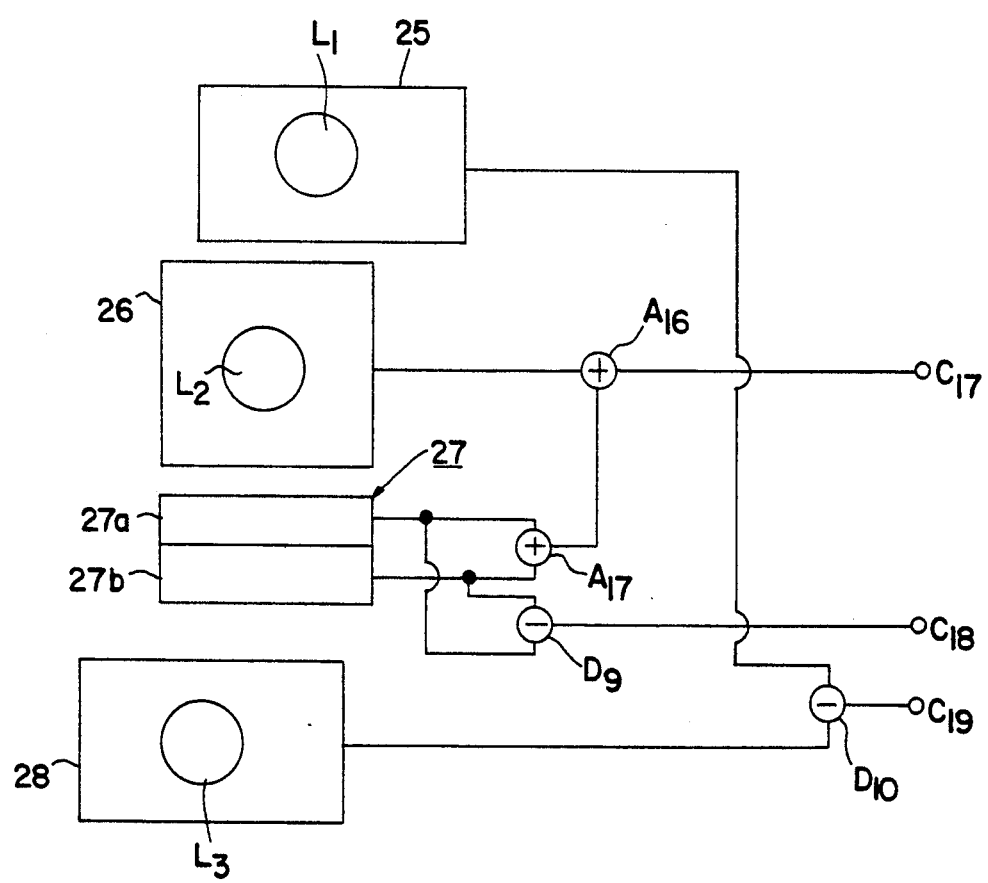
FIG. 26 shows a sensor and signal processing circuit in the fourth embodiment.

FIG. 26 shows the photo-sensing planes of the sensors and a signal processing circuit in the present embodiment. The light beams $L_1$, $L_2$ and $L_3$ are sensed by the sensors 25, 26 and 28, respectively. The sensor 27 senses a portion of the light beam $L_2$ split by the optical element 24 in the defocus state. The principle of detection of the focus error signal from the light beam $L_2$ is the same as that in the third embodiment and the explanation thereof is omitted. The outputs of the split photo-sensing planes 27a and 27b of the sensor 27 are differentiated by a subtractor $D_9$ so that the focus error signal is produced at the terminal $C_{16}$. The outputs from the photo-sensing planes 27a and 27b are summed by an adder $A_{17}$ and a sum signal is added to the output of the sensor 26 by an adder $A_{16}$ so that a reproduced RF signal is produced at the terminal $C_{17}$. The outputs of the sensors 25 and 28 are finitely differentiated by a subtractor $D_{10}$ by the three-beam method so that the tracking signal is produced at the terminal $C_{19}$.

The present invention is not limited to the illustrated embodiments, but various modifications thereof may be made. For example, a half-mirror may be provided in a light path of the detection light beam and a light beam split thereby may be sensed by a separate sensor to produce the reproduced RF signal.

When the object to be tested is transparent, the focus error signal may be produced by a light beam which passes through the object. The present invention is applicable not only to the disk apparatus, but also to other optical information recording and reproducing apparatus and optical instruments such as a shape detector or a range finder.

The present invention covers all such modifications without departing from the scope of the claims.

What we claim is:

1. A focus detector comprising:
    focusing means for focusing a detection light beam onto a surface to be examined;
    a single optical element located at an expected refocus point of the detection light beam after being reflected by or passing through the surface to be examined, said optical element comprising a surface disposed away from the detection beam optical axis for splitting off a portion of the detection light beam reflected by or passing through the surface only when the detection light beam is not in an in-focus state on the surface to be examined;

receiving means for receiving the portion of the detection light beam split off by said optical element, said receiving means being positioned such that the detection light beam reflected by or passing through the surface when refocused at the expected refocus point is not detected by said receiving means, and said receiving means comprising a plurality of detection surfaces split in relation to a line extending along the surface of said optical element; and means for generating a focus error signal by differentiating respective outputs of the detection surfaces of said receiving means.

2. A focus detector according to claim 1, wherein said focusing means comprises a light source and a first lens system for focusing a light beam emitted from said light source onto the surface.

3. A focus detector according to claim 2, further comprising a second lens system for focusing the detection light beam.

4. A focus detector according to claim 1, wherein said optical element comprises a plate-like transparent member with one side thereof being planar and the other side thereof having a plane parallel to said one side and a plane inclined with respect to said one side, and said inclined plane is positioned out of the expected refocus point of the detection light beam.

5. A focus detector according to claim 4, wherein said parallel plane is of strip shape having a width corresponding to a beam waist of the detection light beam.

6. A focus detector according to claim 5, wherein said surface has a track thereon and a longitudinal direction of said stripe-shaped parallel plane is substantially orthogonal to the track.

7. A focus detector according to claim 4, wherein said receiving means includes a first photo-detector, said first photo-detector includes a two-split photo-receiving plane for receiving the detection light beam refracted by said inclined plane and a signal processing circuit for finitely differentiating output signals from the respective photo-receiving planes of said first photo-detector.

8. A focus detector according to claim 7, further comprising a second photo-detector for detecting a light beam passed through the parallel plane.

9. A focus detector according to claim 8, wherein the surface is an information record surface having a track thereon, and said second photo-detector detects at least one of an information signal and a tracking signal.

10. A focus detector comprising:

focusing means for focusing a detection light beam onto a surface to be examined;

a single optical element located at an expected refocus point of the detection light beam after being reflected by or passed through the surface to be examined, said optical element comprising a first surface on which the reflected or passed-through light is always incident and a second surface on which a portion of the reflected or passed-through light is incident only when the detection light beam is not in an in-focus state on the surface to be examined, said second surface splitting off the portion of the reflected or passed-through light from the portion of the detection light beam other than that which is incident on said first surface;

receiving means for receiving the portion of the reflected or passed-through light, split off by said second surface of said optical element, said receiving means being positioned such that the reflected or passed-through light is not detected by said receiving means when the reflected or passed-through light is refocused at the expected refocus point, and said receiving means comprising a plurality of detection surfaces divided by a dividing line extending along a boundary between said first and second surfaces of said optical element; and means for generating a focus error signal by differentiating respective outputs from the detection surfaces of said receiving means.

11. A focus detector according to claim 10, wherein said focusing means comprises a light source for emitting a light beam and a first lens system for focusing the light beam emitted from the light source onto the surface to be examined.

12. A focus detector according to claim 11, further comprising a second lens system for focusing the light beam reflected by or passed-through the surface to be examined.

13. A focus detector according to claim 10, further comprising a second receiving means for receiving a light beam from said first surface.

14. A focus detector according to claim 13, wherein said surface to be examined is an information recording surface having a track thereon, and said second receiving means comprises means for generating at least one of an information signal and a tracking signal.

15. A focus detector according to claim 10, wherein said optical element comprises a plate-shaped transparent member, one side of which comprises a flat surface and another side of which comprises first and second surfaces, said first surface of said transparent member being arranged parallel to said flat surface and said second surface of said transparent member being inclined relative to said flat surface.

16. A focus detector according to claim 15, wherein said first surface of said transparent member has a striped shape with a width substantially corresponding to a beam waist of the reflected or passed-through light.

17. A focus detector according to claim 16, wherein the surface to be examined includes a track, and said stripe-shaped first surface of said transparent member is arranged in a longitudinal direction substantially orthogonal to the track.

18. A focus detector comprising:

focusing means for focusing a detection light beam onto a surface to be examined;

a single optical element located at an expected refocus point of the detection light beam after being reflected by or passing through the surface to be examined, said optical element splitting off a portion of the detection light beam reflected by or passing through the surface only when the detection light beam is not in an in-focus state on the surface to be examined;

receiving means for receiving the portion of the detection light beam split off by said optical element, said receiving means being positioned such that the detection light beam reflected by or passing through the surface when refocused at the expected refocus point is not detected by said receiving means, and said receiving means comprising a plurality of detection surfaces; and means for generating a focus error signal by differentiating respective outputs from the detection surfaces of said receiving means.

19. A focus detector according to claim 18, wherein said focusing means comprises a light source for emitting a light beam and a first lens system for focusing the light beam emitted from said light source onto the surface to be examined.

20. A focus detector according to claim 19, further comprising a second lens system for focusing the light beam reflected by or passed through the surface to be examined.

21. A focus detector according to claim 18, wherein said optical element comprises a transparent member having a mirror formed on a portion thereof.

22. A focus detector according to claim 21, wherein said mirror has a striped shape with a width corresponding to a beam waist of the reflected or passed-through light beam.

23. A focus detector according to claim 22, wherein the surface to be examined includes a track, and said striped-shaped mirror is arranged in a longitudinal direction substantially orthogonal to the track.

24. A focus detector according to claim 18, wherein said optical element comprises a plate-shaped transparent member, one side of which comprises a flat surface and another side of which comprises first and second surfaces, said first surface of said transparent member being arranged parallel to said flat surface and said second surface of said transparent member being inclined relative to said flat surface.

25. A focus detector according to claim 24, wherein said first surface of said transparent member has a striped shape with a width substantially corresponding to a beam waist of the reflected or passed-through light.

26. A focus detector according to claim 25, wherein the surface to be examined includes a track, and said stripe-shaped first surface of said transparent member is arranged in a longitudinal direction substantially orthogonal to the track.

* * * * *